United States Patent [19]
Schubert

[11] Patent Number: 4,742,998
[45] Date of Patent: May 10, 1988

[54] ACTIVE VIBRATION ISOLATION SYSTEM EMPLOYING AN ELECTRO-RHEOLOGICAL FLUID

[75] Inventor: Dale W. Schubert, Sudbury, Mass.

[73] Assignee: Barry Wright Corporation, Newton Lower Falls, Mass.

[21] Appl. No.: 760,863

[22] Filed: Jul. 31, 1985

Related U.S. Application Data

[63] Continuation-in-part of Ser. No. 716,026, Mar. 26, 1985, abandoned.

[51] Int. Cl.$^4$ .......................... F16F 9/00; F16F 15/02
[52] U.S. Cl. .................................. 267/136; 267/140.1; 267/35; 137/807; 188/322.5
[58] Field of Search ................. 267/136, 122, 8 R, 35, 267/140.1, 64.15, 64.19, 64.23; 188/1.11, 378–380, 299, 319, 267–269, 322.13, 322.5; 248/542, 550, 562, 636, 638; 91/361, 363, 1; 137/13, 805–807; 73/654; 367/185, 187

[56] References Cited

U.S. PATENT DOCUMENTS

| | | | |
|---|---|---|---|
| 2,846,028 | 8/1958 | Gunther | 188/299 X |
| 3,059,915 | 10/1962 | Kemelhor | 188/1.11 X |
| 3,088,062 | 4/1963 | Hudimac | 188/1.11 X |
| 3,416,549 | 12/1968 | Chaney et al. | 137/807 X |
| 3,548,852 | 12/1970 | Fisher | 137/807 |
| 3,807,678 | 4/1974 | Karnopp et al. | 188/322.5 X |
| 4,165,066 | 8/1974 | Horvat | 267/64.19 X |
| 4,285,054 | 8/1981 | McNeel | 367/187 X |
| 4,351,515 | 9/1982 | Yoshida | 267/136 X |
| 4,352,487 | 10/1982 | Shtarkman | 267/35 |

FOREIGN PATENT DOCUMENTS

0115417  8/1984  European Pat. Off. ......... 267/140.1

Primary Examiner—John W. Caldwell, Sr.
Assistant Examiner—Alvin Oberley
Attorney, Agent, or Firm—Milton E. Gilbert; James W. Mitchell

[57] ABSTRACT

An active vibration isolation system employing an electro-rheological fluid comprises a damper having a servovalve fluidically coupling a load supporting actuator to an accumulator. The servovalve includes an orificed plate arrangement, across which a voltage potential is impressed in accordance with a command signal derived from response sensors. The viscosity of an electro-rheological fluid contained within the servovalve reacts to the voltage potential so as to regulate the fluid flow. In this manner the damping coefficient is modulated to as to approximate a "sky-hook" damper.

24 Claims, 3 Drawing Sheets

ACTIVE VIBRATION ISOLATION SYSTEM EMPLOYING AN ELECTRO-RHEOLOGICAL FLUID

RELATED PATENT APPLICATION

This is a continuation-in-part of commonly owned copending application, Ser. No. 716,026 filed Mar. 26, 1985, now abandoned and entitled "Active Vibration Isolation System," the disclosure of which is hereby incorporated, and is related to copending application Ser. No. 760,850, "Parametrically Controlled Active Vibration Isolation System", having the same filing date as this application.

BACKGROUND OF THE INVENTION

The invention relates to an active vibration isolation apparatus and method, and more particularly to a supportive or suspension system adapted to be coupled between two elements or structures for the reduction of transmitted mechanical excitations therebetween.

Figure 1:
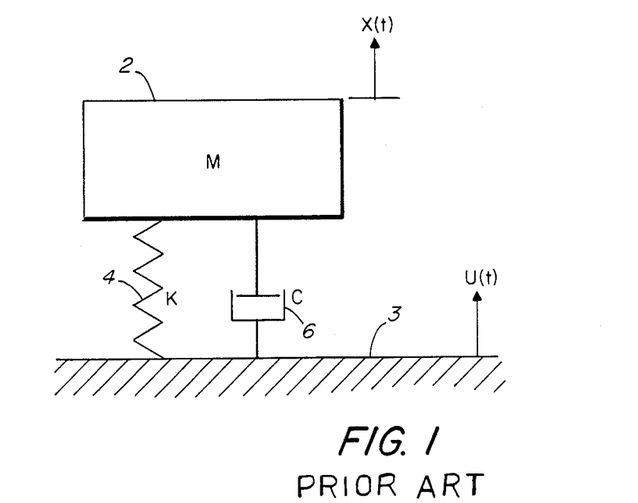
FIG. 1 is a schematic representation of a conventional vibration isolation system using linear viscous damping.

Consider a conventional single degree of freedom vibration isolation system using linear viscous damping such as is presented in FIG. 1. The forces acting on the payload of mass "M", designated by the numeral 2, which is isolated relative to a foundation 3, are the spring force which is described as being equal to the spring stiffness constant "K" times the compression of spring 4 which is the isolator relative deflection, the dissipation force which is the linear damping coefficient "C" times the rate of compression of viscous damper 6 which is the relative velocity. These two forces must be counteracted by the isolated payload mass 2 inertial force which is the payload mass coefficient "M" multiplied by the acceleration of the payload mass itself.

In the vibration isolation field it is well known that damping in linear viscous systems controls the resonant characteristics of the entire vibration isolation system. Adding damping lowers the detrimental effect of the resonance amplification. However, as the damping is increased resonance amplification does indeed go down but the degree of high frequency vibration isolation is lowered. In fact, if the fraction of critical damping is set to unity to eliminate the effect of resonance amplification, nearly all vibration isolation is lost. Even at very high frequencies above the resonant frequency, the rate of vibration isolation only increases by six decibels per octave.

Another well-known type of vibration isolation system is one in which the resonant amplification is well controlled by viscous damping but does so in a manner so as to preserve the vibration isolation offered at high frequencies. This type of vibration isolation system uses a linear viscous damper connected to the isolated payload so as to act as a "sky hook"; the configuration of this type of vibration isolator is presented in FIG. 2. In this figure, the linear viscous damper 6 is connected to the isolated payload 2 at one end and to a stationary location in space at the other end, known as a "sky hook" 8.

It is the stationary connection which makes the passive "sky hook" damped system impossible to construct. For in the world of vibrations all masses that are accessible to the vibration isolation system are also in motion and thus do not act as a true "sky hook". Such a system can be approximated by using active vibration isolation techniques taught in my earlier patent application of which this is a continuation in part. But my earlier invention, like other active vibration isolation systems, is limited in its effectiveness in two areas. First, such systems are generally stability limited and thus cannot be just "slipped in place", so to speak, without the necessary system stabilization circuits tailored to suit the individual application. Secondly, such systems generally require power to operate and are limited in both force and motion output by power requirement limitations imposed by an individual design.

Desirable is an active vibration isolation system having a controlled damping coefficient such that its vibration isolation characteristics can be tailored as desired. Preferably, the characteristics can be tailored to approximate a "sky hook" damper.

Figure 2:
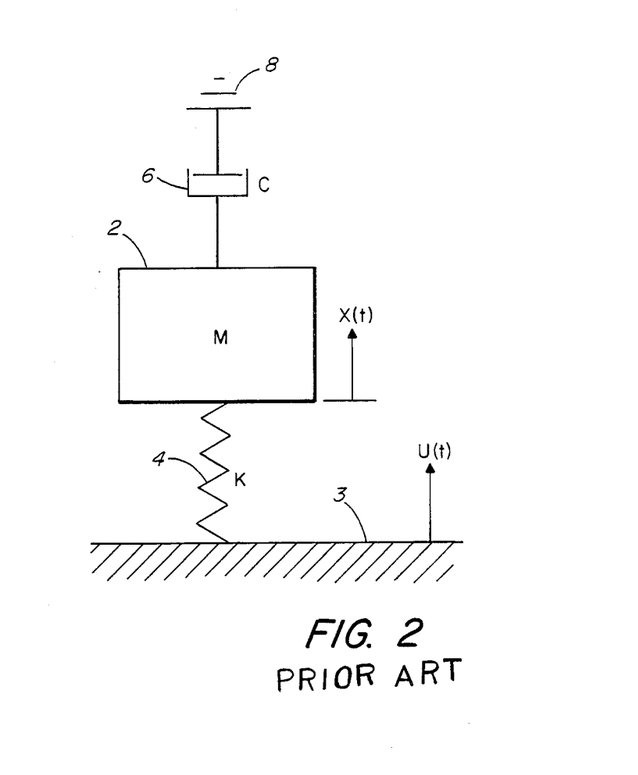
FIG. 2 is a schematic representation of a conventional vibration isolation system with a viscous damper connected as a "sky hook" damper.

Understanding of the present invention would be aided by a brief mathematical analysis of the "sky hook" type vibration isolation system as presented in FIG. 2. For this system, the damping force is equal to the payload's absolute mass velocity times the viscous damping coefficient of the damper.

The equation of motion for the "sky hook" damped vibration isolation system is presented in EQ (1):

$$M(d^2X) = K(U-X) - C(dX) \tag{1}$$

In EQ (1), "dX" and "$d^2X$" are the velocity and acceleration, respectively, of the payload, and "U" is the time-dependent displacement of the foundation relative to which the payload is isolated. (It should be noted that, for convenience, time derivatives shall be symbolized herein without the denominator "dt" or "$dt^2$")

One solution of this equation, for the case of steady state sinusoidal vibration, is the transmissibility vector equation for the "sky hook" damper vibration isolation system. In Laplace Transformation notation, the solution is as follows:

$$\frac{X[S]}{U[S]} = \frac{W_n^2}{[S + 2(\text{zeta})SW_n + W_n^2]} \tag{2}$$

where "$W_n^2$" is equal to "K" divided by "M", "Zeta" is equal to "C" divided by the magnitude of critical damping, and "S" is the Laplace Operator.

The damping term associated with the system's fraction of critical damping, "zeta", appears only in the denominator of EQ (2). This is unlike the analogous solution for the system presented in FIG. 1 wherein the "zeta" term appears in both the numerator and denominator. This seemingly minor difference between the well-known equation for the transmissibility vector for the conventional isolation system and the equation for the "sky hook" damped isolation system has, however, profound effects in the manner in which viscous damping manifests itself in the overall vibration isolation characteristics. In the "sky hook" damped system, as the degree of damping is increased and the fraction of critical damping "zeta" approaches large values above unity, the amplification due to resonance disappears and vibration isolation starts at zero frequency with a peak transmissibility of unit occurring also at zero frequency. More importantly, the increase in damping used to eliminate the system's resonance also adds vibration isolation for all frequencies below the undamped resonant frequency.

For "sky-hook" type systems the effect of additional damping for small fractions of critical damping is virtually the same as for the conventionally damped vibration isolation system in the manner in which the amount of resonant amplification is reduced. However as the fraction of critical damping is increased, exceeding a value of approximately 0.2, it is observed that not only is the amplification of vibration due to the system resonance decreased but at the same time there is no loss of vibration isolation characteristics at frequencies above resonance. This effect continues even for very large fractions of critical damping.

Therefore, it should be apparent than an object of the present invention is to provide an active vibration isolation system exhibiting improved stability and requiring less power than conventional active systems.

A further object of the present invention is to provide a realizable vibration isolation system which is characterized by a transmissibility vector equation approximating that of a "sky hook" damped system, i.e., having the advantageous vibration isolation of a "sky hook" damped system with substantially no resonant amplification.

SUMMARY OF THE INVENTION

These and other objects of the invention are achieved by an active vibration isolation system comprising a first sensor for deriving a first velocity signal representative of the velocity of a payload, a second sensor for deriving a second velocity signal representative of the velocity of a base, a viscous damper disposed to support said payload with reference to said base, means for modulating the damping coefficient of said viscous damper in response to a command signal, and electronic means for continuously generating the command signal in response to said first and second velocity signals, whereby the damping coefficient of said viscous damper is controlled and can approximate that of a "sky hook" vibration isolation system.

According to the preferred embodiment of the invention, both of the velocity sensors are geophones, and the modulating means includes an electro-rheological fluid servovalve response to the command signal for regulating the flow of hydraulic fluid. The servovalve preferably includes an orifice means for fluidically coupling an actuator with an accummulator, each of which having therein an electro-rheological fluid. The orifice means preferably includes first and second conductive elements or plates, and an insulative element or plate interposed therebetween, each of said plates having therein a plurality of orifices. Fluid flow is directed by the orifice means in both a first and second direction along and through said conductive plates. The actuator is adapted and configured to support a payload with reference to a base on which the accummulator rests or to which it is secured. Means for applying a controlled electric field across said orifice means regulates the velocity of the fluid and, therefore, the flow therethrough. This, in turn, modulates the damping coefficient with respect to changes in the electric field so as to achieve the vibration isolation characteristics of a "sky-hook" damper.

The vibration isolation system as described and claimed herein is, in effect, an active system since sensors of motion and actuation implementation devices are required. This damping technique, however, does not require actuation devices which actively generate forces. Many of the disadvantages of more conventional active systems are eliminated because this variable damper generates damping forces passively and uses active methods only to change the value of the instantaneous damping coefficient, a technique which requires less power.

The invention also embraces the method by which vibration isolation is achieved by such a system.

The above and other features of the invention, including various novel details of construction and combination of parts, will now be described with reference to the accompanying drawings and pointed out in the claims. It will be understood that the particular vibration control system embodying the invention is shown and described by way of illustration only and not as a limitation. The principles and features of this invention may be employed in varied and numerous embodiments without departing from the scope of the invention.

DETAILED DESCRIPTION OF THE PREFERRED EMBODIMENT

A. Overview of Basic System and Mathematical Description Thereof

Figure 3:
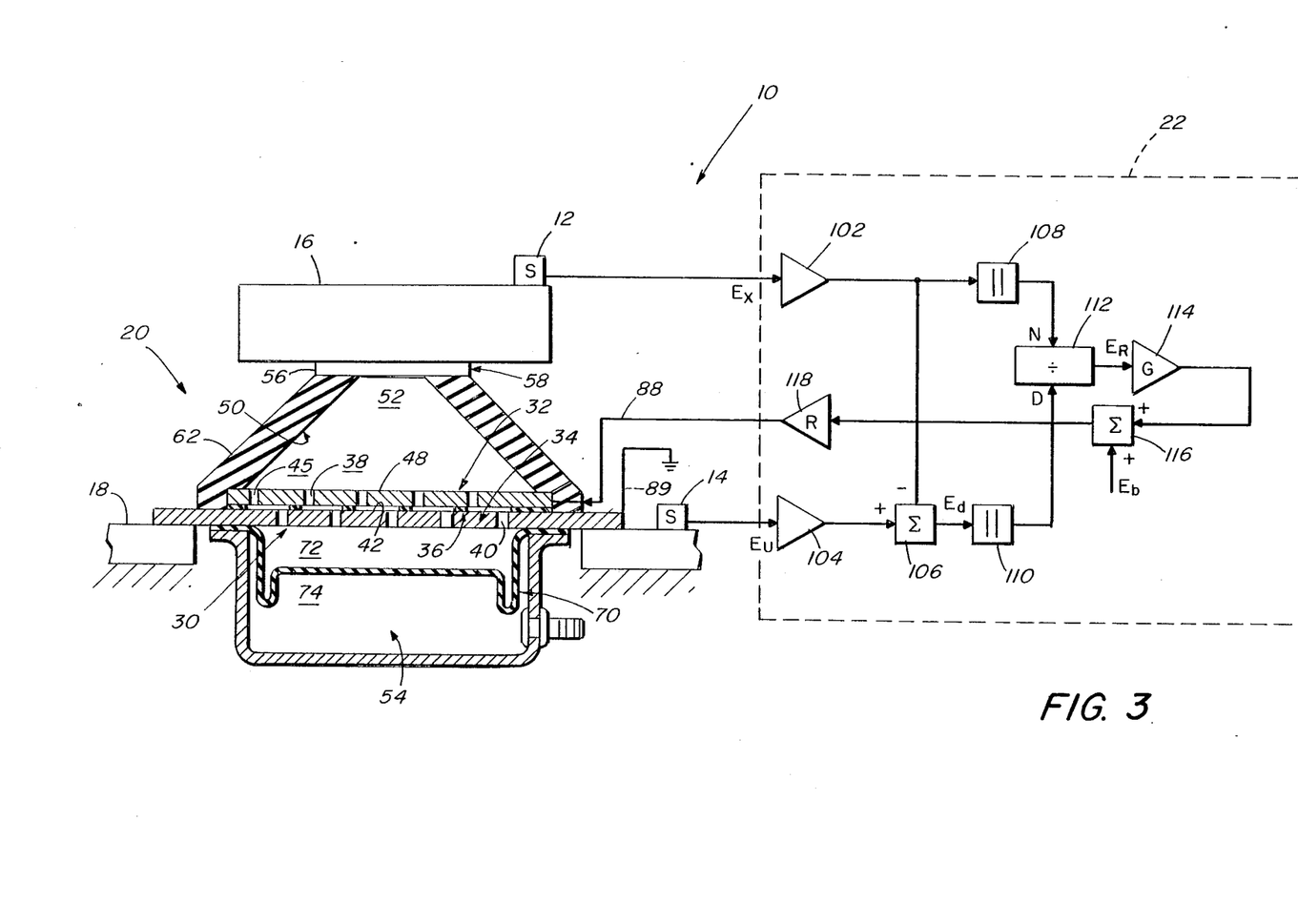
FIG. 3 is a schematic representation of a vibration isolation system employing an electro-rheological fluid servovalve, made in accordance with the present invention.

FIG. 3 presents an active vibration isolation system 10 made in accordance with the present invention, including two response sensors 12, 14 operatively coupled with a payload 16 and foundation or base 18 to derive a signal representative of the velocity of the payload 16 and of the base 18, dX and dU, respectively. It is recognized and discussed in the earlier application of which this is a continuation-in-part, that each of the outputs from the two response sensors 12, 14 gives only an approximation of the velocity due to the physics of the velocity sensor and so may be processed appropriately to yield a more valid velocity signal.

It should be understood that vibratory excitations of the payload 16 or of the base 18 are isolated by the system 10, i.e., their transmission is reduced or eliminated for at least a range of frequencies thereof.

The system 10 further includes a variable damping coefficient viscous damper 20 controlled by a servo-controller 22. The output signal from the servo-controller 22, called herein a "command signal", is used to modulate the damping coefficient in a manner such that the instantaneous damping coefficient is described as shown in EQ (3):

$$\text{Damping Coefficient} = C_1[Abs(A[dX/(dV)])] \quad (3)$$

where "A" is the instantaneous area of the orifice of the viscous damper, "$C_1$" is the damping coefficient when the orifice is fully open, and "dV" is the relative velocity of the payload 16 with respect to the base 18 and is equal to "dU" minus "dX".

With the active damping servo terms of the system established by EQ 3, and assuming the response sensors 12, 14 are identical so as to have identical transfer functions, a simplified differential equation of motion may be written to describe the vibration isolation system 10. Once again using the conventional force summation procedure for the spring, damper and mass inertial forces, an engineer in the art could derive EQ (4):

$$[d^2X] = K[U-X] - C_1(dV)(ABS[A(dX/dV)]) \quad (4)$$

Carefully note that the relative velocity term, "dV", appears both in the numerator and denominator of the damping term expression, and, if it were not for the fact that the synthesized damping coefficient term has no sign, the two terms would cancel exactly and mathematically form a true "sky hook" damped system. The damping term synthesized, however, has no sign since the feedback is used only to modulate the damping coefficient, "C". Realizing this, we can rewrite the equation with the terms cancelled. THe differential equation of motion of EQ (4) simplifies to the form presented in EQ (5)

$$M(d^2X) = K[U-X] - C_1A[ABS(dX)](\text{DELTA}) \quad (5)$$

Here the term "DELTA" is equal to plus or minus one (1) and represents the sign of the relative velocity. Compare EQ (5) with the equation for motion given in EQ (1).

The above mathematical description of the system is idealized in some respects and interfacing with the real world must be considered. The actual ratio of velocities as described above would have an infinite value if the voltage signal representing the absolute payload velocity were finite and the voltage signal representing the relative velocity were zero. This is a condition occurring twice each cycle with sinusoidal vibration and thus is a commonly occurring event. The servo-controller 22 cannot output an infinite voltage, however. Thus, the command signal must be limited to have some specified maximum value which will be called $U_{MAX}$, generally, for example, approximately 10 volts. The command signal, however, may still have all values between $-U_{MAX}$ and $+U_{MAX}$, including zero. In a real system, however, when the command is zero, there must always be some residual damping remaining. Thus, in a realizable system, the damping coefficient must have a minimum value which is hereinafter referred to as "$C_O$". This leads to a formulation of the command signal for a realizable system in the form presented in the EQ (6):

$$\text{Damping Coefficient} = C = C_O[1.0 + A(ABS(dX/dV))] \quad (6)$$

In an actual system, the term $C_O$ is the damping coefficient present when the command signal is zero and the maximum value of the damping coefficient is equal to $C_O[1.0 + A(U_{MAX})]$.

Thus, an active vibration isolation system 10 has been modeled which is characterized by a transmissibility vector equation, EQ (5), approximating that of a "sky hook" damper given in EQ (1), and a damping coefficient dependent on the command signal in accordance with EQ (6). Details of the elements of such a system shall now be described.

B. Viscous Damper 20

As just described, the vibration isolation system 10 in accordance with the present invention operates through the dynamic modulation of the viscous damping coefficient of an otherwise linear vibration isolator. A preferred method of modulating the viscous damping coefficient is shown in FIG. 3. The damper 20 includes a servovalve 30 for automatically metering the flow of the fluid used to provide the damping pressure drops and resulting dissipation forces. An electrical signal input to the servovalve 30 is used as a flow command, called herein the "command signal".

Vibration isolation depends on the time dependent modulation of the magnitude of the damping or dissipation force. The dissipation force is generated passively by the vibration isolation system 10 as relative velocities develop across a dissipation element. The dissipation force is equal to the instantaneous linear viscous damping coefficient, "C", multiplied by the relative velocity of the payload 16. The damping coefficient is the term to be acted upon and controlled in the present invention. Control over the damping coefficient is achieved by the vibration isolation system 10 utilizing the servovalve 30 as a dissipation element within a fluid path to generate the damping or dissipation forces.

The servovalve 30 includes first and second conductive elements or plates 32, 34 and an insulative element or plate 36 interposed therebetween. The first and second conductive plates 32, 34 and the insulative plate 36 include a plurality of orifices, 38, 40, 42, respectively, disposed and configured to form means 45 for directing fluid flow in a first direction and a second direction, preferably through and along the plates 32, 34 as shall be discussed more fully below. The plates 32, 34, 36 together comprise fluidic coupling means 48.

Conductive plates 32, 34 serve as polarizng plates as will be appreciated from the discussion of electro-rheological fluids which follows in the next section.

The damper 20 in addition to the servovalve 30 comprises a support cylinder or receptacle 50 including upper and lower chambers 52, 54 having the servovalve 30 connecting them so as to provide regulated fluidic communication therebetween. The upper chamber 52 is a load bearing chamber and, in combination with a payload support 56, forms a hydraulic, single-acting actuator 58 which is filled with a substantially incompressible fluid of controllably varying viscosity. The lower chamber 54 is a small hydraulic accumulator which acts to store incompressible hydraulic fluid at substantially a constant pressure. The servovalve 30 which regulates the flow of fluid from the actuator 58 to the accumulator 54.

Preferably upper chamber 52 has a substantially conically shaped, deformable wall 62 of a resilient elastomeric material which is bonded to the perimeter of the first conductive plate 32 and to the support plate 56. The support plate 56 is securable to the payload 16 and is, for example, in spaced parallel relation to the first conductive plate 32. The elastomeric material serves to electrically insulate the first conductive plate 32 from the environment. Together, the first conductive plate 32, the support plate 56 and the conical wall 62 define and fluidically seal the upper chamber 52 and render it of variable volume. Its volume changes with deflections of the conical wall 62 in response to applied force, due to loading and/or vibratory excitation.

The accumulator 54 stores the incompressible fluid under pressure in a manner such that pressure changes due to fluid volume changes are small. The static pressure in the vibration isolation system 10 is controlled by a pressurized compressible fluid contained within the accumulator 54. A flexible fabric-reinforced elastomeric diaphragm 70 sealed to the inner wall of the support cylinder 50 separates the accumulator 54 into subchambers 72 and 74, having therein the incompressible and the compressible fluid, respectively. Due to diaphragm 70, subchambers 72, 74 each have variable volumes and therefor are expansible in response to relative pressure changes therein. The device utilized for the accumulator 54 can indeed be a commercially available hydraulic accumulator or the lower pressure version of the hydraulic accumulator, the hydraulic snubber.

The compressible fluid in the subchamber 74, for example, can be a gas or ordinary air. The choice of the compressible fluid in conjunction with its volume and the load support area of the actuator 58 establish the resonance characteristics of the vibration isolation system 10. The function of the compressible fluid is to maintain a positive pressure inside the viscous damper 20 thereby preventing fluid flow blockage by cavitation-like processes.

The function of the accumulator 54 is two-fold. First, the trapped compressible fluid acts as a pneumatic spring to give the vibration isolation system a substantially linear spring stiffness and defines the isolation system undamped natural frequency. The second function is to provide a reservoir for the incompressible fluid which is maintained under a moderately high and substantially constant pressure. This provides the lift in conjunction with the load support area of the support cylinder 50 to support the static load of the payload 16, and provides means for generating linear flow through the servovalve 30 to generate damping dissipation forces which are proportional to the relative velocity and vary linearly in magnitude in accordance to the feedback control signal.

As stated above, the function of the servovalve 30 is to meter the flow of hydraulic fluid according to a desired control function. It does so without moving parts and, thus, can be considered a "solid state" servovalve. This is made possible through the use of an electro-rheological fluid as the incompressible fluid within the receptacle 50.

C. Electro-Rheological Fluid

Electro-rheological fluids, which hereinafter will be abbreviated as "ERF", are described in U.S. Pat. Nos. 4,033,892 and 4,129,513 both to Stangroom, and entitled "Electric Field Responsive Fluids", and in U.S. Pat. No. 4,342,334 to Stangroom entitled "Hydraulic Servovalve", the disclosures of each being incorporated herein. ERF is currently being marketed through Cyanamid Inter-American Corporation division of American Cyanamid in the United States, and at present has no trade name and, thus, goes under its generic name.

Briefly stated, ERF is a fluid which, when exposed to an electrical potential field, has the ability of changing viscosity. The change is substantially instantaneous and is linearly dependent on the strength of the field.

ERF is an oil based fluid of a normally low viscosity to which is added small polymer grains having a very thin coating of ordinary water. The behavior of the ERF in the absence of a polarizing electric field is that of a normal, low viscosity, incompressible, hydraulic oil. However, the very thin water film on the polymer grains is polarized due to the strong polarity of the water molecule itself, and in the presence of a strong electrical voltage field, the grains of water-coated polymer align themselves with the voltage field and tend to stick to each other. The end effect of the particle alignment and adhesion in the presence of an electrical potential field is that the fluid viscosity increases.

The ERF viscosity, as a function of a polarizing voltage potential, is substantially linear and extends to viscosity magnitudes characteristic of a slurry or semi-solid which does not flow under gravitational forces alone. At a potential of 4000 volts per millimeter the slurry becomes nearly solid.

Importantly, the viscosity vs. voltage characteristics are linear, but the effect of the polarization voltage field on the fluid viscosity does not start at an electrical potential of zero volts, but rather starts at the polarization voltage of $E_o$ volts.

The polarization voltage magnitudes required to affect the viscosity of the ERF are relatively large in magnitude. This places design constraints on the size and configuration of the coupling means 48, for example, on the spacing or separation of the conductive plates 32, 34 which impress the electric field-inducing voltage on the ERF. However, the resistivity of the ERF is fortunately very high so that the applied power levels are well within the range of solid state control devices. Note that if small orifice spacings are utilized having dimensions for the polarization plate spacing on the order of 0.1 millimeter, the control polarization voltage is less than 400 volts DC, which is a manageable situation for currently available control devices.

In accordance with the invention, the viscous damper 20 has a variable damping coefficient dependent on the viscosity of the ERF as it flows through the flow directing means 45 of the coupling means 48. The viscosity is responsive to changes in the strength of the electric field. The electric field strength is determined and controlled by the command signal. A brief discussion of fluid mechanics for the coupling means 48 will aid in the understanding of the invention.

Assume, first, that the flow of a non-viscous ideal fluid through the coupling means 48 is essentially unimpeded for the flow rates to be experienced in typical operation of the vibration isolation system 10. For non-viscous flow, the system 10 ideally exhibits no damping. This should hold true if the area of the flow directing means 45, ie., the combined flow area of the orifices 38,40,42 in plates 32, 34, 36, is very large. The viscous flow, "Q", of fluid through the orifices 38, 40, 42 is proportional to the pressure drop, "dP", across them divided by the viscosity, "N", of the fluid. It is also proportional to the relative velocity of the payload 16 with respect to the base 18. This is expressed mathematically in EQ (7):

$$Q = R(dP)/N = A_c(dU - dX) = A_c(dV) \quad (7)$$

Where "R" is an experimentally determined coefficient of proportionality, and "$A_c$" is the effective load supporting area of the viscous damper 20.

However, as has already been explained, the fluid viscosity is proportional to the control voltage, with the constant of proportionality being "R".

The damping force, "$F_d$", , as engineers in the field would appreciate, is given in EQ (8):

$$F_d = C_o[1 + A(ABS(dX/dV)]dV = A_c dP \quad (8)$$

Then, it follows by substitution of the above equations that the equation for the command signal, "$E_c$", is given by EQ (9):

$$E_c = (RC_o)(1 + GAIN(ABS(dX/dV)))/(rA_c^2) \quad (9)$$

The command signal is thus directly proportional to the control function of the basic feedback control system itself. In this case, the command signal is the control polarizing voltage applied to the coupling means 38, and is equal to the control function times a constant of proportionality which is best determined experimentally.

If the polarizing voltage potential "$E_c$", is applied to conductive plate 32, and conductive plate 34 is maintained at ground potential, separated by the small dimension "r", which is the length of the flow path through which the ERF flows, the electric charge, "q", on the conductive plate 32 is defined by EQ (10):

$$q = cE_c \qquad (10)$$

The capacitance "c" of the two conductive plates 32, 34 is defined by EQ (11):

$$c = AE_c/(4(\text{pi})r) \qquad (11)$$

where "A" is the plate area, "pi" is 3.14159, and "$E_c$" is the electric potention on the plate 32.

The effect of the polarization voltage on the charged ERF particles is given by EQ (12):

$$H = AE_c/(4(\text{pi})r^3) \qquad (12)$$

where "H" is the force exerted on the ERF in the flow directing means 45, and "A" is the area of the conductive plates 32, 34 (which, for ease in computation, are assumed to be identical in size and configuration). Thus, the resulting fluid viscosity will be proportional to the polarization voltage magnitude and inversely proportional to the cube of the distance separating the two conductive plates 32, 34, or in mathematical form, as given by EQ (13):

$$\text{Viscosity} = BE_c/r^3 \qquad (13)$$

where B is an experimentally determined constant.

D. Servovalve 30

As described above, the servovalve 30 includes first and second conductive plates 32, 34 and an intermediate insulative plate 36. The first and second conductive plates 32, 34 are, for example, stacked on top of and under the intermediate plate 36, and in contact therewith, and are of a substantially conductive material such as steel, copper or other conductive material. The intermediate plate 36 is of a substantially insulative material of high resistivity.

Dimensions for the thickness of the conductive and insulative plates 32, 34, 36 are to a large degree to be experimentally determined. However, as a starting point, with due regard to the design limitations imposed by the requirements for the ERF as discussed above, the conductive plates 32, 34 could be on the order of 1.0 millimeter in thickness with the insulative plate 36 being on the order of one tenth that thickness.

The top conductive plate 32 is connected by conductor 88 to the output of the servo-controller 20. Conductor 88 passes through the conical wall of the upper chamber 52. The bottom conductive plate 34 is connected by conductor 89 preferably to ground potential which sets its voltage to zero.

Figure 4:
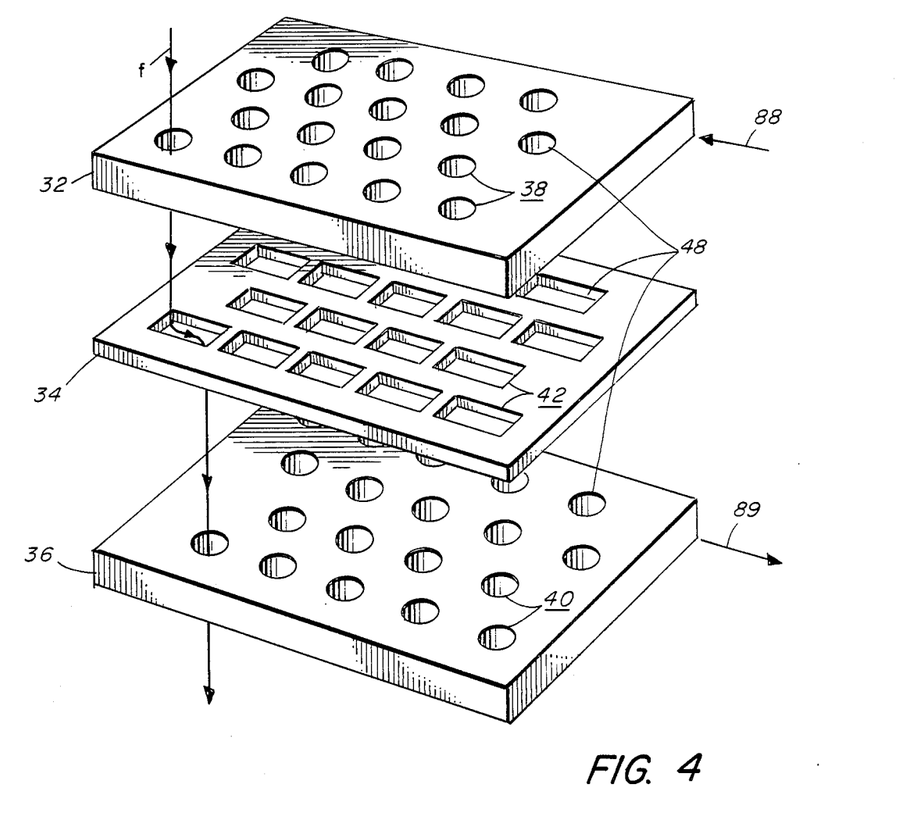
FIG. 4 is a perspective view of a servovalve for use with electro-rheological fluid, made in accordance with the present invention.

FIG. 4 shows the servovalve 30 in perspective. Coupling means 38 includes the flow directing means 45 for fluidicly coupling the upper conductive plate 32 to the lower conductive plate 34 by directing flow in a first direction from one perpendicularly towards the other and in a second direction along one or both of said conductive plates 32, 34. Upper and lower conductive plates 32, 34 each include a plurality of orifices 38, 40 therethrough. Orifices 38, 40 can be, for example, of circular or eliptical cross-sectional configuration. Insulative plate 36 includes numerous orifices 42 which preferably, so as to obtain the second direction of flow, are in the form of elongate slots or channels. Of importance to the invention is the alignment of orifices 38, 40, 42. Preferably, each of the orifices 38 are disposed in the coupling means 48 immediately above one end of one of the orifices 42, and one of the orifices 40 are disposed immediately below the other end of said one of the orifices 42.

The flow of the ERF takes place, for example, by fluid entering the orifices 38 in the conductive plate 32 flowing within and along the elongate orifices 42 in the insulative plate 36, and through the orifices 40, thereby existing the coupling means 45, as shown by the flow arrows in FIG. 4. Thus, the ERF flows in the first direction perpendicular to the planes defined by the conductive plates 32, 34, then in the second direction which is parallel to the planes, and finally in the first direction again. Importantly, this flow path forces the ERF to travel a considerable distance between the conductive plates 32, 34 and within the elongate orifice 42 before it can exit the servovalve 30. Thus, the polarization voltage induced viscosity of the ERF will provide considerable restriction of flow through viscous friction developed between the ERF and the conductive plates 32, 34. It should be understood that other configurations of the flow directing means 45 are within the purview of the invention. Key is that they should provide an extended flow path. For example, the flow directing means could include channels disposed on the opposing surfaces of the conductive plates 32, 34 contiguous to the elongate slots so as to increase the area of the conductive plates 32, 34 exposed to the ERF.

It should also be understood that the conductive plates 32, 34 could be of other configurations, nesting one within the other. An engineer in the art would readily envision the use of nesting cylindrical, spherical or "cup" shaped conductive elements.

Finally, it should be apparent that the invention need not be practiced by employing only two conductive elements 32, 34. Rather, a greater number could be used with each two being separated by an insulative layer. In such a case, the flow directing means would fluidicly interconnect the two outermost conductive elements.

E. Vibration Isolation

The means by which vibratory excitations are isolated by the system 10 can be briefly explained.

Under the influence of an upward traveling vibratory motion, the conical wall 62 will deflect as a result of the inertial force generated by the payload 16 causing a reduction of the volume of the upper chamber 52. This volumetric reduction causes a pressure increase to be experienced by the ERF inside the upper chamber 52, such that a pressure differential is established between the upper chamber 52 and the lower chamber 54, and, in other words, across the coupling means 38. The pressure differential causes the flow of ERF within the flow directing means 45, through the coupling means 38 and between the actuator 58 and the accumulator 54. Friction within the fluid in the coupling means 38 dissipates mechanical energy of vibration as heat, thereby resulting in damping of the vibration.

The undamped resonant characteristics of the vibration isolation system 10 is established by its static mechanical stiffness. The mechanical stiffness is determined mainly from the mechanical stiffness of the elastomeric conical walls 62. However, a portion of the total isolator stiffness will be due to the action of the compressed air in the hydraulic accumulator 54. The required pressure of the compressed air must be experimentally determined. In any event, however, it must be sufficient to avoid cavitation of the flow of the ERF under maximum vibratory excitation under which the vibration isolation system 10 is designed to operate in a particular application.

F. Response Sensors 12, 14

As discussed above, the payload 16 and the base 18 are provided with response sensors 12, 14 which generate, or derive after processing, signals representative of the velocity of the payload 16, abbreviated "dX", and the velocity of the excitation of the base 18, abbreviated "dU", respectively.

The response sensors 12, 14 can be accelerometers such as piezo-electric accelerometers, having their outputs integrated to yield a velocity signal, or electro-mechanical velocity sensors such as and preferably a geophone type mechanism. Geophones are discussed extensively in the earlier application, of which this is a continuation-in-part. The informational content of the sensor signals is not substantially utilized for frequencies below the isolation system undamped resonant frequency; thus the motion sensor frequency response need not extend down to extremely low frequencies.

The implementation of each of the sensors 12, 14 should be such that the sensor resonant frequency should be at least one octave in frequency below the resonant frequency of the vibration isolation system 10. This, then limits the application of electro-mechanical velocity sensors such as geophones to vibration isolation systems having resonant frequencies above approximately ten cycles per second. Integrated accelerometers can be utilized as velocity sensors for vibration isolation systems having resonant frequencies below about ten cycles per second.

G. Electronic Servo-Controller 20

The servo-controller 20 shown in FIG. 4 uses the two velocity signals to generate a control function to be applied to the servovalve 30 as the command signal in the form required by EQ (9). While an all analog system is shown, it can be converted to a digital system using analog to digital and digital to analog converters for communication with the response sensors 12, 14 and the servo-controller 22. These changes are well within the skill of an engineer in the art.

The flow path of the control system signals starts with applying the output voltages $E_X$ and $E_U$ from the sensors 12, 14 to coupling means 102, 104, respectively. The function of the coupling means 102, 104 is to convert the high impedance signal from the velocity sensors 12, 14 to low impedance signals which can undergo additional manipulation without the input impedances of other circuit elements altering them, i.e., impedance matching. The coupling amplifier means 102, 104 may include, where appropriate, circuit elements (not shown) such as an amplifier to establish a desired voltage scale factor for the velocity signal; and/or frequency manipulation circuits to artificially lower the resonant frequency of the sensor, or integration circuits to integrate the acceleration signals from accelerometer sensors where used for the response sensors 12, 14 instead of velocity sensors.

The circuit used to artificially lower the resonant frequency of the sensor comprises one or two operational amplifiers (not shown) used to generate a double lag-lead transfer function. Details of this circuit and the integration circuit are well within the skill of one in this art. Details of the synthesis of linear transfer functions utilizing operational amplifiers, can be found in my prior application, of which this is a continuation-in-part.

The output signals from the coupling amplifier means 102, 104 (which signals for simplicity shall be still referred to as $E_X$ and $E_U$, respectively) are fed to a substraction circuit 106 to form a voltage signal, "$E_d$" which is the difference between the signals $E_X$ and $E_U$ and represents the relative velocity.

The signals $E_X$ and $E_d$ are then inputted into processing means 108, 110 for converting them to their absolute values.

The two absolute valued signals are then fed into an analog divider circuit 112 which also acts as an output voltage limiter; $E_X$ is fed to the numerator and $E_d$ is fed to the denominator. The divider circuit's output is the velocity ratio $E_R$ which is limited to voltages under a maximum magnitude.

The velocity ratio is then applied to the input of an amplifier 114 having gain G.

Next, the amplified velocity ratio signal is fed to a summer 116, where a constant voltage "$E_b$" is added to the velocity ratio as a bias.

The output signal from the summer 116 is fed into amplifier 118 having a gain "R".

The resulting voltage signal is that required to control the viscosity of the ERF as given above in EQ (9). It is this signal which is applied as the command signal to the upper conductive plate 32.

The magnitudes of the voltage bias "$E_b$" and the gain "R" are adjusted such that their product is just slightly greater than the voltage "$E_o$" at which the ERF viscosity starts to increase so that when "dx" is zero the resulting system damping yields a system fraction of critical damping of zetazero; and when the velocity ratio is at its maximum value, the system fraction of critical damping is zetazero(1+Max Velocity Ratio). With these adjustments, the electronics are scaled to yield the desired system characteristics.

The control function can also be implemented using a digital microprocessor. In the case of digital synthesis of the command signal, the coupling amplifiers 102, 104 would be replaced by a multiplexed analog to digital converter, and the final gain stage would be a digital to analog converter. All the inbetween computation would be performed by the microprocessor using dedicated software. In instances where multiple isolators are used to configure a multi-degree of freedom vibration isolation system, a single microprocessor can control all the unit isolators using multiplexed analog-to-digital and digital-to-analog converters as the input and output means of the microprocessor.

H. Alternative Embodiment

It must be recognized at this point that the vibration isolation system 10 will function with an actuator other than that shown in FIG. 3. The servovalve 30 may, in actual practice, be placed between any two ERF filled cavities suitably designed to generate damping forces when the resulting vibration isolation system is subjected to vibratory excitation. For example the solid state servovalve 30 could replace the servovalve described in the co-pending application entitled "Parametrically Controlled Active Vibration Isolation System", more fully identified above, the disclosure of which being incorporated herein. Thus, the present invention could be practiced with the rolling diaphragm actuator taught in that specification. Optionally, a further embellishment of the invention is to include the height sensing and control device also described in that specification.

I claim:

1. A viscous damper comprising:
   (a) means for deriving a first signal representative of the velocity of relative motion between first and second elements connected by said viscous damper for the reduction of transmitted excitations therebetween;
   (b) means for deriving a second signal representative of the velocity of one of said first and second elements;
   (c) means for generating a command signal in response to the ratio of said second signal to said first signal; and
   (d) means for modulating the damping coefficient of the viscous damper in response to the command signal to approximate the vibration isolation characteristics of a "sky hook" type damper.

2. The viscous damper of claim 1 wherein the modulating means includes an actuator, an accumulator, means for fluidically coupling said actuator to said accumulator, with an electro-rheological fluid, and means for directing fluid flow through said coupling means in response to an applied voltage.

3. The active vibration isolation system of claim 1 wherein said viscous damper means generates damping forces substantially in accordance with the following equation:

$$F_d = C_o[1 + A(ABS(dX/dV))]dV$$

where
   "$F_d$" is the damping force,
   "$C_o$" is a system constant,
   "$A$" is a system constant,
   "ABS" means 'absolute value of',
   "dX" is the payload velocity, and
   "dV" is the relative velocity of the payload with respect to the base.

4. An active vibration isolation system comprising:
   (A) means connectable to a payload and a base for generating a signal representative of the instantaneous ratio of the absolute velocity of said payload to the relative velocity between said payload and said base; and,
   (B) viscous damper means
      (i) including a servovalve through which an electro-rheological fluid can flow in response to a range of vibratory motions between said payload and said base,
      (ii) characterized by a variable instantaneous damping coefficient dependent on the viscosity of the electro-rheological fluid,
      (iii) for generating transmissibility characteristic substantially the same as a sky-hook type damper, and
   (C) and wherein said servovalve includes means for modulating the viscosity of the electro-rheological fluid in response to said generated signal and, thereby, modulating the variable damping coefficient of the viscous damper in response to said generated signal.

5. The active vibration isolation system of claim 4 characterized by a differential equation of motion substantially in accordance with the following equation:

$$M[(dX^2)] = [U - X] - C_1 A[ABS(dX)](\Delta)$$

where
   "M" is the payload mass,
   "$(dX^2)$" is the payload acceleration,
   "K" is the spring stiffness constant,
   "U" is the displacement of the base,
   "X" is the displacement of the payload,
   "$C_1$" and "A" are system constants,
   "ABS" means the 'absolute value of',
   "dX" is the payload velocity, and
   "$\Delta$" is plus or minus one (1).

6. The active vibration isolation system of claim 4 wherein the servovalve is a solid state servovalve.

7. The active vibration isolation system of claim 4 wherein said viscosity modulating means includes first and second conductive orificed elements, and a third insulative orificed element disposed between said first and second elements, and means for applying said generated signal between said first and second conductive elements, said viscosity modulating means characterized by a fluid path between said first and second elements and through said third element.

8. The active vibration isolation system of claim 7 wherein said generated signal is a voltage signal applied between said first and second elements substantially in accordance with the following equation:

$$E_c = (RC_o)(1 + GAIN(ABS\, dx/dv))/rA_c^2.$$

where
   "$E_c$" is the voltage potential,
   "R" is an experimentally determined coefficient of proportionality,
   "$C_o$" is the damping present when $E_c = 0$,
   "GAIN" is a scaling constant,
   "ABS" means 'the absolute value of',
   "dX" is the payload velocity,
   "dV" is the relative velocity of the payload relative to the base,
   "r" is the fluid path length between the first and second conductive elements, and
   "$A_c$" is the effective payload supporting area of the viscous damper.

9. A method for reducing the transmission of vibratory motion between first and second elements by using a viscous damper mounted therebetween and supporting said first element comprising:
   (A) deriving a first signal representative of the velocity of relative motion between said first and second elements;
   (b) deriving a second signal representative of the absolute velocity of said first element;
   (c) generating a command signal as a function of the ratio of said second signal to said first signal; and
   (d) generating transmissibility characteristics substantially the same as those of a sky-hook type damper, including the step of modulating the damping coefficient of said viscous damper in response to said command signal.

10. The method of claim 9 wherein the modulating step includes the steps of:

(i) directing the flow of a fluid through an orificed element included in the viscus damper, said fluid having viscosity variable in response to a change in an electric field applied thereto, and (ii) applying the electric field in response to the command signal across said orificed element, and thereby modulating the damping coefficient of the viscous damper.

11. The method of claim 10 wherein the orificed element includes first and second conductive plates and a third insulative plate disposed therebetween, said first, second and third plates having orifices therethrough in fluidic communication, and said electric field applying step includes the step of applying an electric voltage between said first and second plates substantially in accordance with the following equation:

$$E_c = (RC_o)(1 + GAIN(ABSdx/dv))/rA_c^2$$

where
"$E_c$ is the voltage potential,
"R" is an experimentally determined coefficient of proportionality,
"$C_o$" is the damping present when $E_c=0$,
"GAIN" is a scaling constant,
"ABS" means 'the absolute value of',
"dX" is the payload velocity,
"dV" is the relative velocity of the payload relative to the base,
"r" is the fluid path length between the first and second conductive elements, and
"$A_c$" is the effective payload supporting area of the viscous damper.

12. A viscous damper for use with a substantially incompressible electro-rheological fluid, including a passive dissipation element comprising servovalve means for metering the flow of fluid therethrough and thereby providing damping pressure drops and resulting dissipation forces, said servovalve means comprising first and second conductive plate elements, substantially parallel to one another, in spaced relation and having opposing surfaces, and in contact with an insulative element disposed therebetween and defining means for directing fluid flow therethrough including first orifice means for directing fluid flow in a first direction through said first conductive element, second orifice means for directing fluid flow through said second conductive element, and third orifice means for directing fluid flow in a second different direction along said opposing surfaces, adjacent said insulative element, and between said first and second orifice means; and, wherein said insulative element defines a plurality of channels, each in fluid communication at one end thereof with one of the first orifice means and at the other end thereof in fluid communication with one of the second orifice means.

13. The viscous damper of claim 12 further comprising a support receptacle including upper and lower chambers fluidically coupled by said servovalve means, said upper chamber including means for holding said incompressible electro-rheological fluid and means for supporting a payload, said lower chamber including means for storing said incompressible electro-rheological fluid at a substantially constant pressure such that pressure changes due to fluid volume changes are insubstantial, said servovalve means regulating the flow of said incompressible electro-rheological fluid between said upper and lower chambers.

14. The viscous damper of claim 13 wherein said means for supporting a payload includes a payload support in spaced relation to said first conductive element and a deformable wall of resilient elastomeric material bonded to the perimeter of said first conductive element and to said payload support for defining and fluidically sealing said upper chamber, wherein said upper chamber is of a volume which can vary with deflections of the conical wall in response to weight of a payload supported by the payload support and vibratory excitations applied thereto, wherein said incompressible electro-rheological fluid serves as a hydraulic fluid for the support of said payload.

15. The viscous damper of claim 14 wherein said lower chamber includes means for controlling the pressure of said incompressible electro-rheological fluid, said pressure controlling means including a diaphragm separating said lower chamber into first and second subchambers for respectively storing therein a substantially incompressible fluid adjacent said servovalve and a compressible fluid, said first and second subchambers having volumes which vary in response to pressure changes therein, wherein inertial forces caused by vibratory motion of the payload cause a reduction of volume in the upper chamber, causing, in turn, a pressure increase therein and a resulting pressure differential between said upper chamber and said first subchamber and a resulting flow of the electro-rheological fluid therebetween, and wherein said fluid flow damps said vibratory motion.

16. The viscous damper of claim 15 wherein said lower chamber comprises means for supporting a payload with substantially linear spring stiffness, and means for generating flow through said servovalve means and thereby generating dissipation forces in response to vibratory excitations applied thereto.

17. The viscous damper of claim 16 further including means for varying the dissipation forces in accordance with a feedback signal.

18. The viscous damper of claim 17 wherein said servovalve means is "solid state".

19. The viscous damper of claim 12 wherein said incompressible electro-rheological fluid includes a base and polymer grains having a coating of water suspended in the base, and is characterized by a viscosity which varies with the strength of an applied electrical field.

20. The viscous damper of claim 19 further comprising means for creating an electric field by applying a voltage potential between said first and second conductive elements.

21. The viscous damper of claim 20 wherein said voltage potential is applied in accordance with:

$$E_c = (RC_o)(1 + GAIN(ABS(dx/dv))/rA_c^2$$

where
"$E_c$ is the voltage potential,
"R" is an experimentally determined coefficient of proportionality,
"$C_o$" is the damping present when $E_c=0$,
"GAIN" is a scaling constant,
"ABS" means 'the absolute value of',
"dX" is the payload velocity,
"dV" is the relative velocity of the payload relative to the base,
"r" is the fluid path length between the first and second conductive elements, and "$A_c$" is the effective payload supporting area of the viscous damper.

22. The viscous damper of claim 20 wherein the viscosity of the incompressible fluid varies in proportion to the applied electrical potential divided by the cube of the length of the fluid path between said first and second conductive elements.

23. The viscous damper of claim 12 wherein the plates are each on the order of 1.0 millimeter in thickness, and the insulative element is a plate of high resistivity on the order of 0.1 millimeter in thickness.

24. The viscous damper of claim 15 wherein said first and second orifice means include orifices for directing fluid flow through one of said first and second plates in a direction substantially perpendicular to the planes defined by said plates, said third orifice means includes a plurality of elongate channels connecting said orifices of said first orifice means to said orifices of said second orifice means for directing fluid flow in a direction parallel to the planes defined by said plates, whereby an extended fluid flow path is provided.

* * * * *